US012149018B2

(12) United States Patent
Kraenzlein et al.

(10) Patent No.: US 12,149,018 B2
(45) Date of Patent: Nov. 19, 2024

(54) CONTACT DEVICE AND METHOD FOR PRODUCING THE CONTACT DEVICE

(71) Applicant: TE Connectivity Germany GmbH, Bensheim (DE)

(72) Inventors: Harald Kraenzlein, Woert (DE); Daniel Leiminger, Woert (DE); Andreas Oettle, Woert (DE); Stefan Raab, Woert (DE); Thomas Liebl, Bensheim (DE); Marina Hertlein, Woert (DE)

(73) Assignee: TE Connectivity Germany GmbH, Bensheim (DE)

( * ) Notice: Subject to any disclaimer, the term of this patent is extended or adjusted under 35 U.S.C. 154(b) by 367 days.

(21) Appl. No.: 17/576,373

(22) Filed: Jan. 14, 2022

(65) Prior Publication Data

US 2022/0231444 A1 Jul. 21, 2022

(30) Foreign Application Priority Data

Jan. 15, 2021 (DE) ......................... 102021100806.9

(51) Int. Cl.
*H01R 13/432* (2006.01)
*H01R 13/50* (2006.01)
*H01R 43/16* (2006.01)

(52) U.S. Cl.
CPC ........... *H01R 13/432* (2013.01); *H01R 13/50* (2013.01); *H01R 43/16* (2013.01)

(58) Field of Classification Search
CPC ...... H01R 13/432; H01R 13/50; H01R 43/16; H01R 4/185; H01R 13/11
See application file for complete search history.

(56) References Cited

U.S. PATENT DOCUMENTS 3,860,316 A * 1/1975 Hardesty ................ H01R 24/62 439/425
5,207,603 A * 5/1993 Peloza .................. H01R 13/04 439/882
5,489,223 A 2/1996 Faje et al.
(Continued)

FOREIGN PATENT DOCUMENTS

CN 105337075 A 2/2016
DE 102012219741 A1 4/2014
(Continued)

OTHER PUBLICATIONS

German Office Action, App. No. 10 2021 100 806.9, dated Sep. 20, 2021, 6 pages.

(Continued)

*Primary Examiner* — Abdullah A Riyami
*Assistant Examiner* — Nelson R. Burgos-Guntin
(74) *Attorney, Agent, or Firm* — Barley Snyder

(57) ABSTRACT

A contact device includes a contact housing and a contact element. The contact housing defines a contact receptacle and a latching receptacle opening into the contact receptacle. The contact element includes a contact body arranged within the contact receptacle and extending in a longitudinal direction and adapted to contact a mating contact of a mating contact device, and a latching spring connected to the contact body on a first end and extending along a spring axis into the latching receptacle. The latching spring has a stop inclining obliquely with respect to the spring axis and abutting a face of the latching receptacle and a recess formed through the latching spring at first distance from the stop face.

19 Claims, 5 Drawing Sheets

(56) References Cited

U.S. PATENT DOCUMENTS

| | | | | |
|---|---|---|---|---|
| 7,014,515 | B2* | 3/2006 | Lutsch | H01R 13/113 439/852 |
| 7,503,813 | B1* | 3/2009 | Osterhart | H01R 13/113 439/852 |
| 8,226,436 | B2 | 7/2012 | Suzuki | |
| 8,641,458 | B2 | 2/2014 | Matsumura et al. | |
| 8,708,719 | B2 | 4/2014 | Iihoshi | |
| 9,543,683 | B2 | 1/2017 | Leonhardt et al. | |
| 9,859,644 | B2* | 1/2018 | Hu | H01R 13/432 |
| 10,522,934 | B2 | 12/2019 | Zhang et al. | |
| 11,171,446 | B2* | 11/2021 | Metzler | H01R 13/6272 |
| 2005/0054247 | A1* | 3/2005 | Lutsch | H01R 13/113 439/843 |
| 2007/0123093 | A1* | 5/2007 | Lutsch | H01R 13/432 439/445 |
| 2011/0034072 | A1* | 2/2011 | Feldman | H01R 13/6585 439/578 |
| 2017/0077637 | A1* | 3/2017 | Lappoehn | H01R 13/432 |
| 2017/0133783 | A1* | 5/2017 | Hu | H01R 13/432 |
| 2017/0271803 | A1* | 9/2017 | Hu | H01R 13/432 |
| 2017/0324184 | A1* | 11/2017 | Lehner | H01R 13/187 |
| 2019/0074626 | A1 | 3/2019 | Rouillard et al. | |
| 2019/0363487 | A1* | 11/2019 | Metzler | H01R 13/6272 |

FOREIGN PATENT DOCUMENTS

| | | | |
|---|---|---|---|
| DE | 102016223641 | A1 | 6/2017 |
| JP | H8227751 | A | 9/1996 |
| JP | 2017139213 | A | 8/2017 |
| JP | 201950195 | A | 3/2019 |
| WO | 9702626 | A1 | 1/1997 |
| WO | 2013007659 | A1 | 1/2013 |
| WO | 2014067974 | A1 | 5/2014 |

OTHER PUBLICATIONS

Extended European Search Report, Application No. 22151416.9-1201, Dated: Jun. 2, 2022, 10 pages.

Office Action from Japan's Patent Office dated Feb. 7, 2023, corresponding to Application No. 2022-002681 with English translation, 11 pages.

Examination Report dated Apr. 15, 2024, corresponding to Application No. 22 151 416.9-1201, 6 pages.

Chinese First Office Action dated Feb. 28, 2024 with English translations, corresponding to Application No. 202210030814.4, 17 pages.

* cited by examiner

CONTACT DEVICE AND METHOD FOR PRODUCING THE CONTACT DEVICE

CROSS-REFERENCE TO RELATED APPLICATIONS

This application claims the benefit of German Patent Application No. 102021100806.9 filed on Jan. 15, 2021, the whole disclosure of which is incorporated herein by reference.

FIELD OF THE INVENTION

The present disclosure relates to an electrical device and in particular, to a contact device having a latching spring.

BACKGROUND

Contact assemblies typically comprise a contact element installed within a contact housing. For example, prior art contact devices include a contact housing and a contact element, wherein the contact element is secured within the contact housing via a latching spring. Specifically, the latching spring engages into a latching receptacle of the contact housing for securing the contact element therewith. Existing latching springs suffer from several drawbacks including, but not limited to, inadequate strength and/or stiffness, insufficient retention strength, as well as unnecessary size.

Accordingly, improved contact devices are desired, as well as improved methods for producing such a contact device.

SUMMARY

A contact device according to an embodiment of the present disclosure includes a contact housing and a contact element. The contact housing defines a contact receptacle and a latching receptacle opening into the contact receptacle. The contact element includes a contact body arranged within the contact receptacle and extending in a longitudinal direction and adapted to contact a mating contact of a mating contact device, and a latching spring connected to the contact body on a first end and extending along a spring axis into the latching receptacle. The latching spring has a stop inclining obliquely with respect to the spring axis and abutting a face of the latching receptacle and a recess formed through the latching spring at first distance from the stop face.

BRIEF DESCRIPTION OF THE DRAWINGS

The invention will now be described by way of example with reference to the accompanying Figures, of which.

DETAILED DESCRIPTION OF THE EMBODIMENTS

Figure 1:
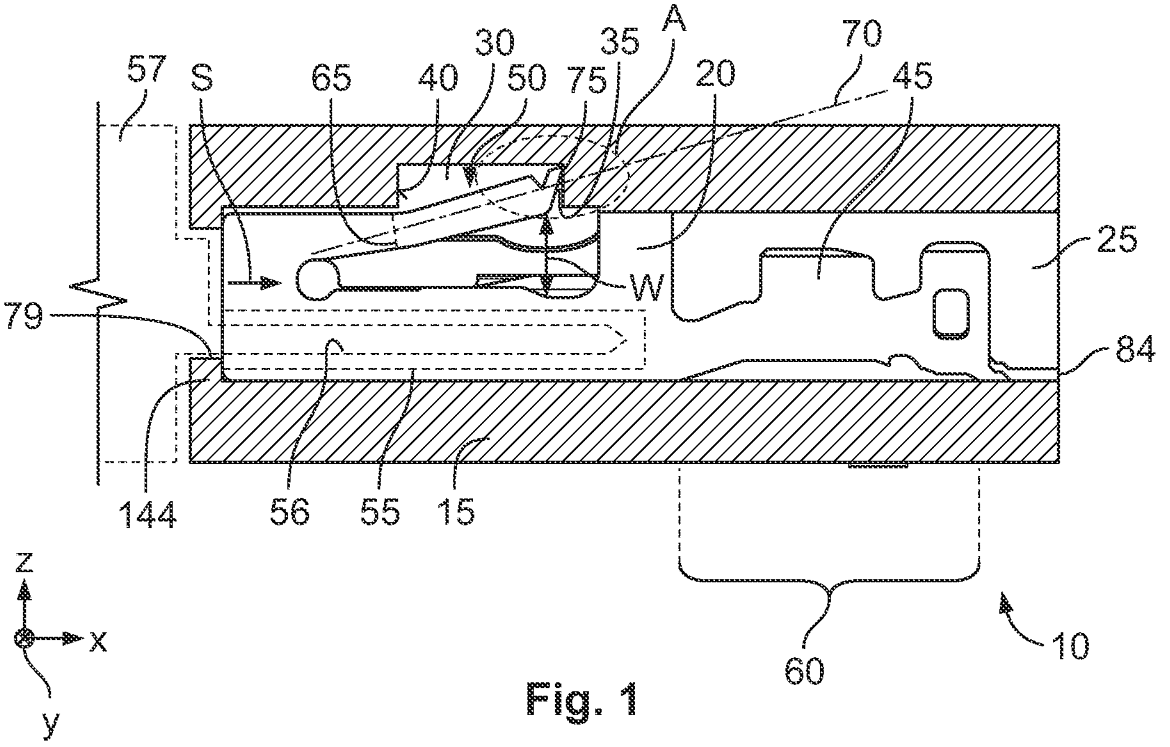
FIG. 1 shows a half longitudinal section through a contact device according to a first embodiment.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Reference is made to a coordinate system in the following figures. The coordinate system has an x-axis (longitudinal direction), a y-axis (transverse direction) and a z-axis (vertical direction). The coordinate system is configured, by way of example, as a right-handed system and serves to facilitate understanding.

FIG. 1 shows a half longitudinal section through a contact device 10 according to a first embodiment. The contact device 10 is configured, for example, for transmitting data signals. The contact device 10 has, for example, a contact housing 15 and a contact element 20. The contact housing 15 has a contact receptacle 25 which extends between a first opening 79 and a second opening 84 of the contact housing 15 in the longitudinal direction. The contact receptacle 25 extends substantially, by way of example, in the longitudinal direction over an entire length of the contact housing 15. The contact housing 15 further has a latching receptacle 30.

The latching receptacle 30 extends in the vertical direction and is arranged above the contact receptacle 25 by way of example in FIG. 1. The latching receptacle 30 opens out in the contact receptacle 25. The latching receptacle 30 is delimited in the x-direction by a first receptacle side face 35 and a second receptacle side face 40, which is situated opposite in the x-direction. The first receptacle side face 35 and the second receptacle side face 40 adjoin the contact receptacle 25.

The contact element 20 has a contact body 45 and a latching spring 50. The contact body 45 extends, in its main direction of extent, substantially in the longitudinal direction. The contact body 45 can have, for example, a mating contact receptacle 55 (indicated in dashed lines in FIG. 1) or a plug-in contact (not illustrated in FIG. 1). The mating contact receptacle 55 serves, for example, to receive a mating contact 56 of a mating contact device 57 in order to establish electrical contact between the mating contact 56 and the contact body 45. By way of example, the mating contact 56 can be inserted into the mating contact receptacle 55 of the contact element 20 via the first opening 79.

The contact body 45 can further have a connection portion 60, wherein the connection portion 60 is arranged offset with respect to the latching spring 50 in the longitudinal direction by way of example. The connection portion 60 serves to electrically connect the contact element 20 to an electrical conductor of a data cable. For example, the electrical conductor can be crimped or welded to the connection portion 60.

On a side facing away from the connection portion 60 in the x-direction and on a side facing the first opening 79, on the contact body 45 by way of example the latching spring 50 is connected by way of a fixed end 65 to the contact body 45. The latching spring 50 extends along a spring axis 70. The spring axis 70 is arranged obliquely inclined with respect to the x-axis or with respect to an xy-plane. The latching spring 50 projects from the contact receptacle 25 into the latching receptacle 30. The latching spring 50 and the latching receptacle 30 can have substantially the same extent in the longitudinal direction.

During assembly, the contact element 20 is inserted into the contact receptacle 25 via the second opening 84, until preferably the end side of the contact body 45 stops against a projection 144 of the contact housing 15 at the first opening 79.

Figure 2:
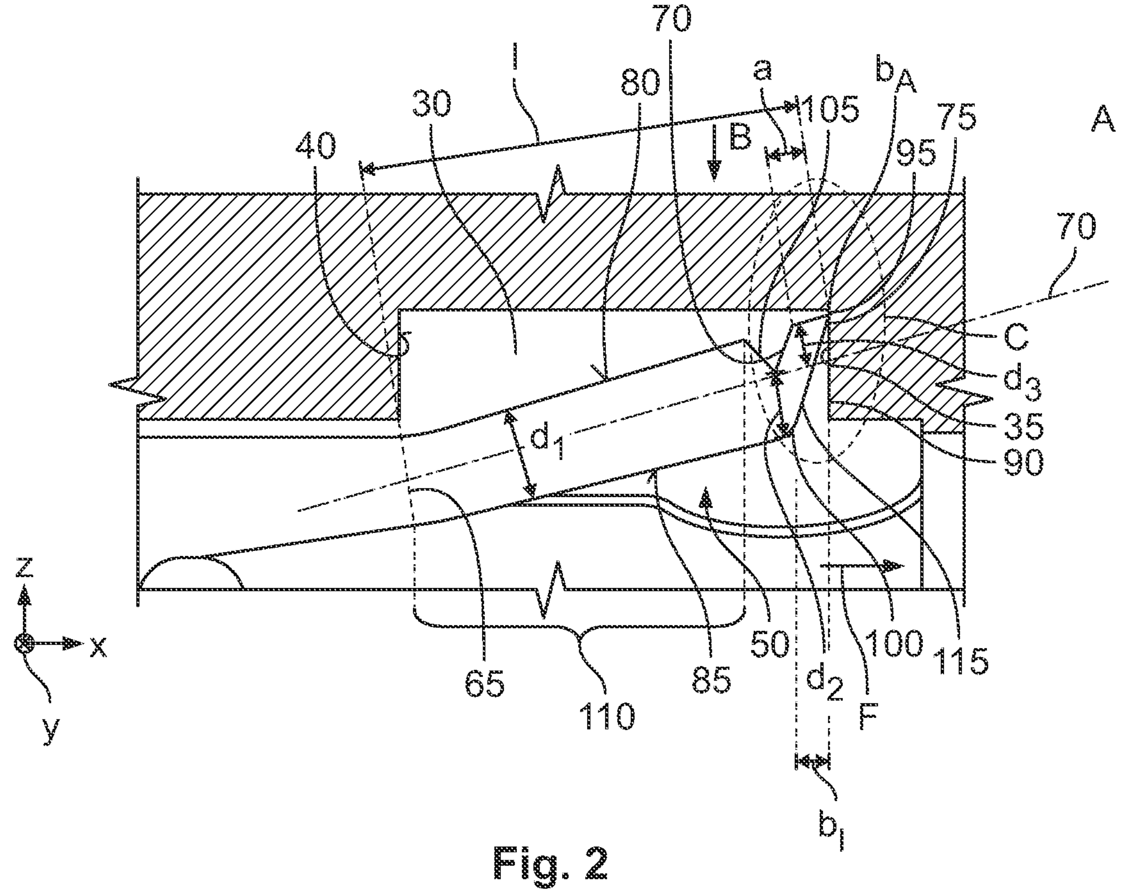
FIG. 2 shows a detail A, labelled in FIG. 1, of the contact device shown in FIG. 1.

FIG. 2 shows a detail A, labelled in FIG. 1, of the contact device 10 shown in FIG. 1. The latching spring 50 projects into the latching receptacle 30 in an end position of the contact element 20 in the contact housing 15. The latching spring 50 extends from the fixed end 65 along the spring axis 70 substantially in a straight line. The latching spring 50 is of, for example, plate-like form. The latching spring 50 ends at a free end 75 which is situated opposite the fixed end 65 in the longitudinal direction. The latching spring 50 has an outer side 80 on a side facing away from the contact body 45, and an inner side 85 on a side facing the contact body 45. The outer side 80 is substantially of planar form. Similarly, the inner side 85 is substantially of planar form. The latching spring 50 has a stop face 90 at the free end 75. The stop face 90 connects the outer side 80 to the inner side 85. The stop face 90, at an outer edge 95, adjoins the outer side 80 in the vertical direction. The stop face 90 adjoins the inner side 85 at an inner edge 100. The stop face 90 extends preferably entirely in a plane obliquely inclined with respect to the spring axis 70.

The latching spring 50 further has an embossed portion 105 on the outer side 80. The embossed portion 105 is arranged at a predefined first distance a from the stop face 90, in particular from the outer edge 95. The embossed portion 105 is of slot-like form and extends in its main direction of extent substantially transversely with respect to the spring axis 70 and therefore substantially in the y-direction. The embossed portion 105 has, by way of example, a triangular profile in the half longitudinal section. A different profile of the embossed portion 105 would also be possible.

The embossed portion 105 divides the latching spring 50 into a first spring portion 110 and a second spring portion 115 along the spring axis 70. The first spring portion 110 extends between the fixed end 65 and the embossed portion 105 along the spring axis 70. The second spring portion 115 extends between the stop face 90 and the embossed portion 105 along the spring axis 70. In the first spring portion 110, the latching spring 50 substantially has a first material thickness $d_1$ between the inner side 85 and the outer side 80. The first material thickness $d_1$ is substantially constant over the first spring portion 110.

A second minimum material thickness $d_2$ between the inner side 85 and the embossed portion 105 is reduced in relation to the first material thickness $d_1$. In particular, the second minimum material thickness $d_2$ is from 10 percent to 98 percent of the first material thickness $d_1$ inclusive. A third material thickness $d_3$ from the embossed portion 105 toward the stop face 90 can decrease in the second spring portion 115.

The latching spring 50 has a maximum total extent 1 along the spring axis 70 between the fixed end 65 and the outer edge 95. It is particularly advantageous when the predefined first distance a between the embossed portion 105 and the stop face 90, in particular between the embossed portion 105 and the outer edge 95, in a direction parallel with respect to the spring axis 70 is between 1 percent and 50 percent, preferably 1 percent and 30 percent, in particular 1 percent and 15 percent, advantageously 3 percent to 50 percent, preferably 3 percent to 30 percent, in particular 3 percent to 15 percent, inclusive of the maximum total extent 1 of the latching spring 50.

In the embodiment, the stop face 90 is arranged obliquely inclined with respect to the first receptacle side face 35 in the state in which the contact element 20 is mounted in the contact housing 15. Here, by way of example, the fixed end 65 is arranged on a longitudinal side of the latching spring 50 that faces the second receptacle side face 40. The stop face 90 is, for example, oriented obliquely with respect to the spring axis 70 in such a way that a second distance bA in the longitudinal direction between the outer edge 95 and the first receptacle side face 35 is considerably smaller than a third distance $b_1$ in the longitudinal direction between the inner edge 100 and a plane in which the first receptacle side face 35 runs. Withdrawal or removal of the contact element 20 in the longitudinal direction via the second opening 84 is prevented by the stop face 90 stopping against the first receptacle side face 35. In this case, the outer edge 95 firstly comes into physical contact with the first receptacle side face 35.

Figure 3:
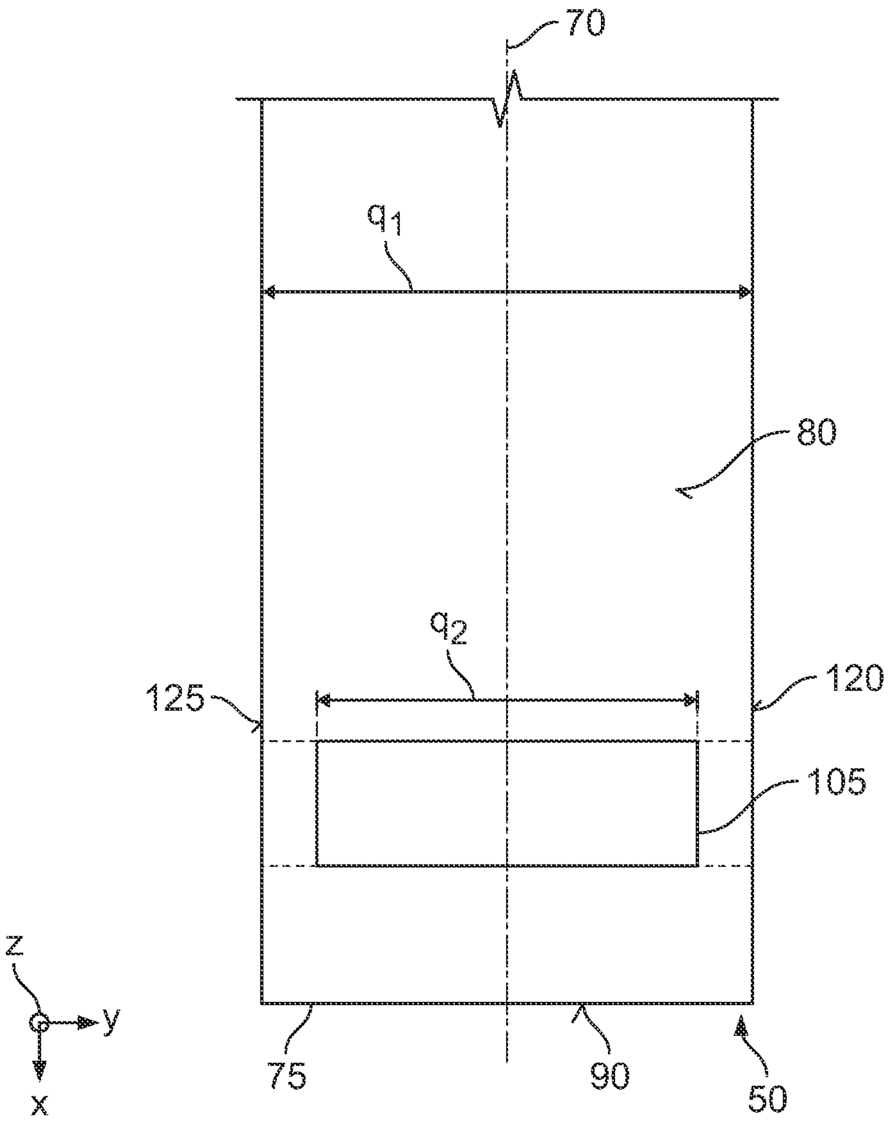
FIG. 3 shows a plan view of a latching spring, shown in FIGS. 1 and 2, with a viewing direction B, shown in FIG. 2, of the latching spring.

FIG. 3 shows a plan view of the latching spring 50 with a viewing direction B, shown in FIG. 2, of the latching spring 50. The latching spring 50 is of substantially plate-like form and has, in plan view, a substantially rectangular configuration. The latching spring 50 has a first side face 120 and a second side face 125, which is arranged opposite the first side face 120 in the transverse direction (y-direction). The first side face 120 and the second side face 125 each extend along the spring axis 70. In this case, the first side face 120 and the second side face 125 can be oriented parallel with respect to the spring axis 70. The first side face 120 and the second side face 125 each connect the outer side 80 of the latching spring 50 to the inner side 85. At the free end 75 of the latching spring 50, the first side face 120 and the second side face 125 each butt laterally against the stop face 90.

The latching spring 50 has a first maximum transverse extent $q_1$ in the transverse direction. It is particularly advantageous when the embossed portion 105 has at least one maximum second transverse extent $q_2$ which is at least 15% to 98% of the first maximum transverse extent $q_1$. The embossed portion 105 can also extend continuously on the outer side 80 entirely in the transverse direction over the outer side 80 between the first side face 120 and the second side face 125 (illustrated in dashed lines in FIG. 3). The embossed portion 105 can also extend on the outer side 80 in a segmented manner in the transverse direction over the outer side 80 between the first side face 120 and the second side face 125, so that the embossed portion 105 is formed from a plurality of partial portions which are arranged spaced apart and next to one another in the y-direction.

Figure 4:
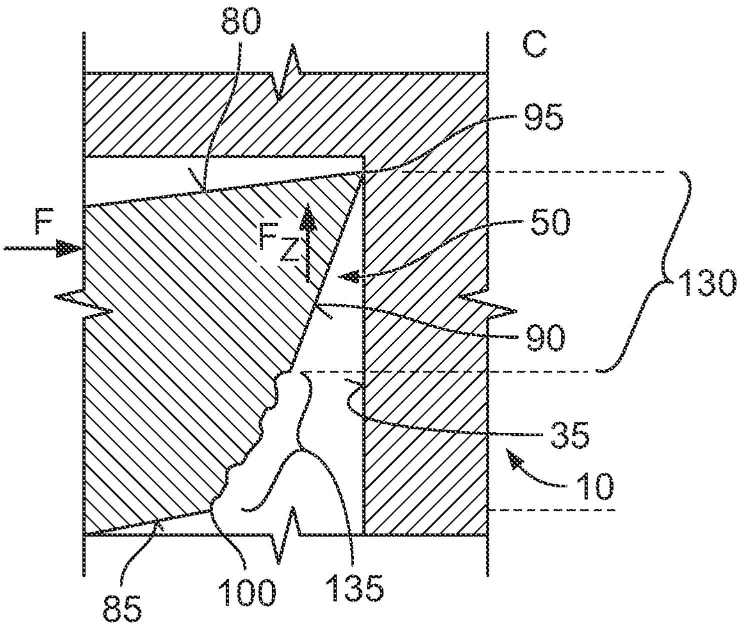
FIG. 4 shows a greatly enlarged detail C, labelled in FIG. 2, of the sectional view, shown in FIG. 2, of the contact device.

FIG. 4 shows an enlarged detail C, labelled in FIG. 2, of the sectional view, shown in FIG. 2, of the contact device 10. The contact element 20 can be produced from a planar blank 140 by means of a punching process. During the punching process, the stop face 90 is punched out of the blank 140. A cutting direction of the stop face 90 runs, for example, from the outer side 80 toward the inner side 85. The result of this is that, during the punching operation, the stop face 90 has a cut portion 130 and a broken portion 135. The cut portion 130 directly adjoins the outer edge 95 and therefore the outer side 80 in the vertical direction. The broken portion 135 is arranged on a side of the stop face 90 that faces the contact body 45, and extends between the inner edge 100 and the cut portion 130 in the vertical direction. In contrast to the cut portion 130, the broken portion 135 is characterized in that a sheet-metal material 150 of the latching spring 50 is broken off during the punching process and as a result differs considerably from the cut portion 130 in which the sheet-metal material 150 of the latching spring 50 is cut and corresponding cut marks are identifiable on the stop face 90. The cut portion 130 has, owing to its cut structure, a considerably lower degree of roughness than the broken portion 135 and as a result its geometry is particularly well defined. Owing to the cut portion 130, the outer edge 95 is sharper than the inner edge 100.

Figure 5:
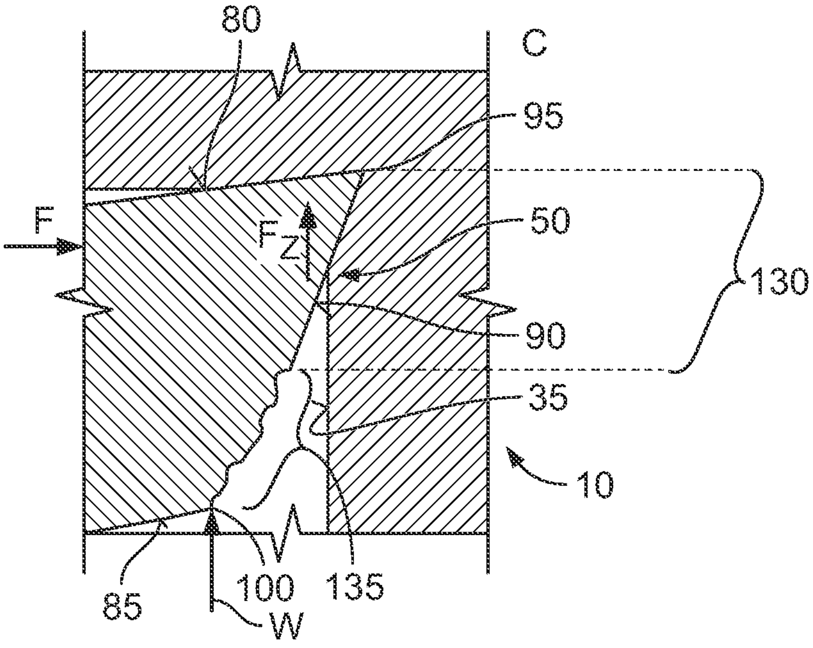
FIG. 5 shows a greatly enlarged detail C, labelled in FIG. 2, of the sectional view, shown in FIG. 2, of the contact device under the action of a force F.

FIG. 5 shows a greatly enlarged detail C, labelled in FIG. 2, of the sectional view, shown in FIG. 2, of the contact device 10 under the action of a force F. Reference will be made to FIGS. 1 to 5 jointly below. The contact element 20 is held in the circumferential direction in the contact housing 15. In the longitudinal direction, which runs counter to a plug-in direction S, the end side of the contact element 20 meets the projection 144 at the first opening 79 of the contact housing 15.

In the plug-in direction S, which runs parallel with respect to the x-axis, the mating contact 56 is inserted, for example, into the mating contact receptacle 55 with the force F. As an alternative, the force F can be introduced into the contact element 20 by pulling on the data cable. The force F is, for example, directed substantially parallel with respect to the x-axis (cf. FIG. 1) and from the first opening 79 to the second opening 84. The force F acting on the contact element 20 is supported on the stop face 90 and the associated first receptacle side face 35 of the contact housing 15 and introduced into the contact housing 15. As a result, a position of the contact element 20 in the contact receptacle 25 is substantially secured. When the force F is introduced into the latching spring 50, the stop face 90, at the outer end 95, bears against the first receptacle side face 35 at the beginning of the force introduction operation (cf. FIG. 4). The inner edge 100 is arranged at a distance from the first receptacle side face 35.

As the force F increases, the outer edge 95 is pressed into the first receptacle face 35. In the process, the outer edge 95 cuts into the material of the contact housing 15 on the first receptacle side face 35 (cf. FIG. 5). The stop face 90, which is oriented obliquely with respect to the x-axis and with respect to the force F, creates a resulting supporting force $F_z$, which acts in the z-direction and is directed away from the contact body 45. The supporting force $F_z$ has the effect that, at the cut portion 130, the stop face 90 penetrates the sheet-metal material 150 of the contact housing 15 away from the contact body 45 and a fourth minimum distance w between the inner edge 100 and the contact body 45 increases as the penetration into the sheet-metal material 150 of the contact housing 15 increases (cf. FIGS. 1 and 5). Owing to the physical contact firstly at the outer edge 95 and the stop face 90 sliding outward on the first receptacle side face 35, the latching spring 50 has a particularly large overlap with the contact housing 15 on the first receptacle side face 35 in the z-direction, so that the force F to be supported by means of the latching spring 50 is particularly high as a result. Here, an overlap is understood to mean that, with projection of the latching spring 50 and the first receptacle side face 35 in the x-direction into a projection plane that is configured as the yz-plane for example, the latching spring 50, in particular the stop face 90, and the first receptacle side face 35 overlap in the projection plane. Furthermore, the stop face 90 is prevented from slipping on the first receptacle side face 35. In addition, a maximum possible force F that can be supported on the first receptacle side face 35 is particularly high as a result. Moreover, the embossed portion 105 reinforces the latching spring 50 at the stop face 90, so that the force F can be introduced into the first receptacle side face 35 particularly effectively, without the contact housing 15 breaking at the first receptacle side face 35 in the process.

Figure 6:
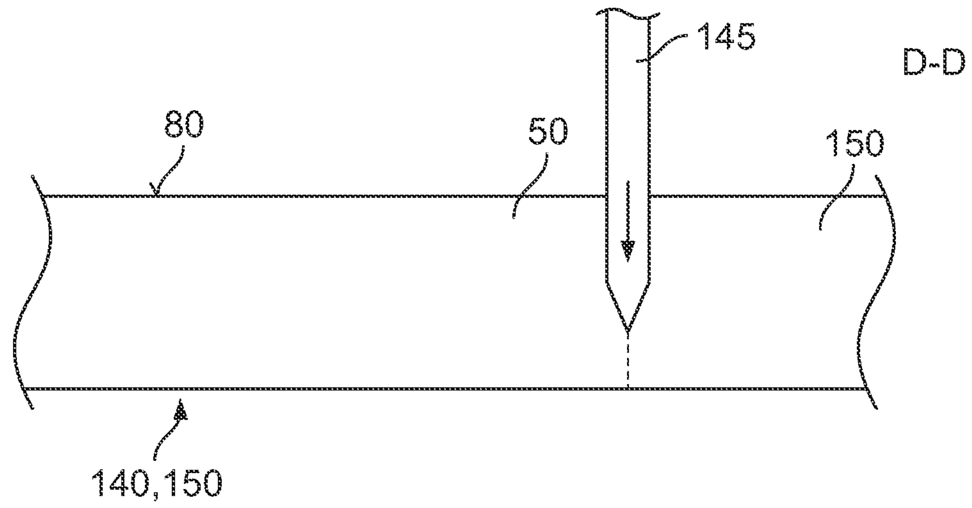
FIG. 6 shows a sectional view along a section plane D-D, shown in FIG. 3, through the latching spring during a first method step.
Figure 7:
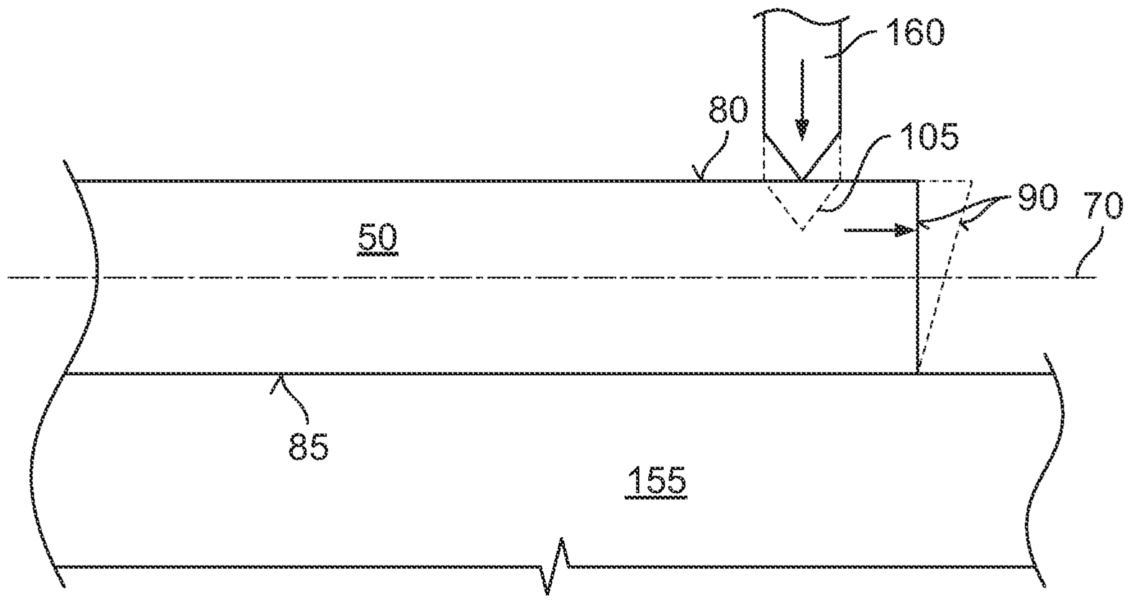
FIG. 7 shows a sectional view along the section plane D-D, shown in FIG. 3, through the latching spring shown in FIG. 3 during a second method step.

FIG. 6 shows a sectional view along the section plane D-D, shown in FIG. 3, through the latching spring 50 during a first method step, and FIG. 7 shows a sectional view along the section plane D-D, shown in FIG. 3, through the latching spring 50 shown in FIG. 3 during a second method step for producing the contact element 20 shown in FIG. 1.

In a first method step (cf. FIG. 6), the blank 140 is punched out of a planar sheet-metal material, for example a thin-walled metal sheet 150, by means of a tool 145. In this case, the sheet-metal material 150 is cut such that the outer side 80 of the latching spring 50 forms on the first side, which faces the tool and with which the punching tool comes into physical contact first and first penetrates the sheet-metal material 150, and the inner side 85 is arranged on the second side, which faces away from the tool 145.

During the punching operation, the tool 145 moves through the sheet-metal material 150 and separates out, for example, a development of the contact body 45 and the latching spring 50 from the sheet-metal material 150. In so doing, the tool 145 first cuts the cut portion 130 of the stop face 90, before, as is customary during punching, the broken portion 135 is formed by breaking or tearing the sheet-metal material 150 just before the tool 145 completely penetrates the sheet-metal material 150.

In a second method step (cf. FIG. 7), which follows the first method step, the cut-out blank 140 is placed onto a die 155. The die 155 is of planar form on the top side. The outer side 80 of the latching spring 50 is arranged on a first side facing the punch 160. The blank 140 bears, by way of a second side which is situated opposite the first side and forms the future inner side 85 of the latching spring 50, on the die 155. The embossed portion 105 is embossed into the outer side 80 of the latching spring 50 using the punch 160. When the embossed portion 105 is embossed into the latching spring 50, the sheet-metal material 150 of the latching spring 50 is pushed in the longitudinal direction in the direction of the stop face 90 (illustrated by means of an arrow running in the longitudinal direction in FIG. 7), so that the stop face 90 is plastically deformed and is formed obliquely inclined out of a substantially 90° inclination with respect to the spring axis 70. In the process, the stop face 90 is displaced on the first side facing away from the die 155, in particular on the cut portion 130 further in the longitudinal direction. As a result, the stop face 90 is inclined with respect to the spring axis 70.

In a third method step, which follows the second method step, the blank 140 is folded in such a way that the embossed portion 105 is arranged on the outer side 80, which faces the contact body 45, of the latching spring 50. In this case, folding of the latching springs 50 is dispensed with, so that the spring axis 70 runs within the latching spring 50, in particular within a cross-sectional area, preferably centrally in the cross-sectional area.

Figure 8:
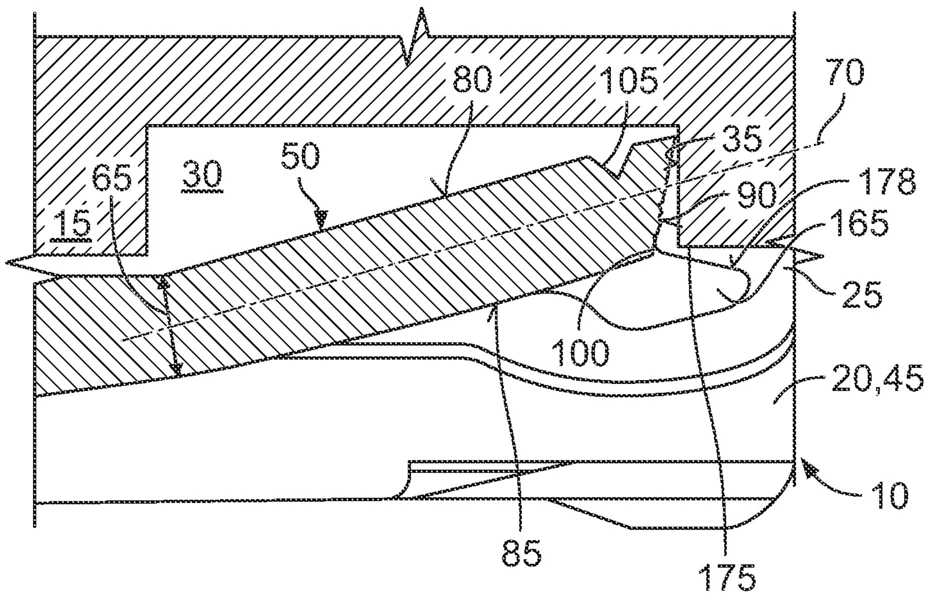
FIG. 8 shows the detail A, shown in FIG. 1, of a contact device according to a second embodiment.

FIG. 8 shows the detail A, shown in FIG. 1, of a contact device 10 according to a second embodiment. The contact device 10 is of substantially identical form to the contact device 10 shown in FIGS. 1 to 7. Only the differences in the contact device shown in FIG. 8 from the contact device 10 shown in FIGS. 1 to 7 will be discussed below.

The latching spring 50 additionally has a retaining portion 165. The retaining portion 165 laterally adjoins the first side face 120 and is of plate-like form running in an xy-plane. The retaining portion 165 projects beyond the stop face 90 in the longitudinal direction. In this case, the retaining portion 165 extends along the spring axis 70 in a direction facing away from the fixed end 65.

In the assembled state, the latching spring 50 engages by way of the stop face 90 into the latching receptacle 30, whereas the retaining portion 165 remains in the contact receptacle 25. In this case, the retaining portion 165, by way of a third side face 170 facing away the contact body 45, can bear against an inner edge 175 of the contact housing 15. The inner edge 175 is formed by a transition between the first receptacle side face 35 and the contact receptacle 25. The third side face 170 can also bear against the inner side of the contact housing 15. In this case, the contact between the third side face 170 and the contact housing 15 prevents the latching spring 50 from pivoting outward too far from the contact body 45 or being pushed too far outward when it penetrates the material of the contact housing 15, as a result of which overloading of the contact housing 15 is avoided.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A contact device, comprising:
- a contact housing, including:
  - a contact receptacle; and
  - a latching receptacle opening into the contact receptacle; and
- a contact element, including:
  - a contact body arranged in the contact receptacle and extending in a longitudinal direction, the contact body adapted to contact a mating contact of a mating contact device; and
  - a latching spring connected to the contact body at a fixed end and extending along a spring axis into the latching receptacle, the latching spring having:
    - a stop face defined at a free end of the latching spring and that inclining obliquely with respect to the spring axis, a displacement of the contact element in the longitudinal direction in the contact receptacle is at least partially blocked by the stop face bearing against a first receptacle side face of the latching receptacle; and
    - an embossed portion arranged at a first distance from the stop face, the embossed portion is a slot in an outer side of the latching spring facing away from the contact body.

2. The contact device according to claim 1, wherein the latching spring has a first spring portion between the embossed portion and the fixed end, the first spring portion has a constant first material thickness along the spring axis and the latching spring has a second material thickness at the embossed portion, second material thickness is reduced in relation to the first material thickness in the first spring portion.

3. The contact device according to claim 2, wherein the second material thickness is between 10 percent and 98 percent of the first material thickness.

4. The contact device according to claim 1, wherein the first distance between the embossed portion and the stop face in the first direction is 1 percent to 15 percent of a maximum total length of the latching spring along the spring axis.

5. The contact device according to claim 1, wherein the stop face extends between an outer edge of the latching spring and an inner edge of the latching spring in a second direction inclined with respect to the longitudinal direction.

6. The contact device according to claim 5, wherein the outer edge is arranged on a side of the free end that faces away from the contact body and the inner edge is arranged on a side of the free end of the latching spring that faces the contact body.

7. The contact device according to claim 1, wherein the stop face extends between an outer edge of the latching spring and an inner edge of the latching spring in a second direction inclined with respect to the longitudinal direction, the outer edge is arranged on a side of the free end that faces away from the contact body and the inner edge is arranged on a side of the free end of the latching spring that faces the contact body.

8. The contact device according to claim 7, wherein a second distance between the outer edge and the first receptacle side face of the latching receptacle is smaller than a third distance between the inner edge and the first receptacle side face.

9. The contact device according to claim 7, wherein the stop face has a cut portion and a broken portion, the cut portion adjoins the outer edge and extends in the second direction toward the contact body, wherein the broken portion extends between the inner edge and the cut portion in the second direction.

10. The contact device according to claim 9, wherein in the cut portion a sheet-metal material of the latching spring is cut from the outer edge, in the second direction, to the inner edge and, in the broken portion, the sheet-metal material of the latching spring is broken toward the inner edge.

11. The contact device according to claim 1, wherein the latching spring has an inner side arranged on a side facing the contact body.

12. The contact device according to claim 11, wherein the latching spring has a first side face and a second side face which is arranged opposite the first side face in a third direction inclined with respect to the longitudinal direction, the first side face and the second side face each connect the outer side to the inner side, the embossed portion extends over at least 15% to 98% of a maximum transverse extent of the latching spring between the first side face and the second side face.

13. The contact device according to claim 1, wherein the slot has a triangular or partially circular profile at least in sections.

14. A contact device, comprising:

a contact housing defining a contact receptacle and a latching receptacle opening into the contact receptacle; and a contact element, including a contact body arranged within the contact receptacle and extending in a longitudinal direction and adapted to contact a mating contact of a mating contact device, and a latching spring connected to the contact body on a first end and extending along a spring axis into the latching receptacle, the latching spring having a stop face inclining obliquely with respect to the spring axis and abutting a face of the latching receptacle and a recess formed into the latching spring at first distance from the stop face, the recess is in an outer side of the latching spring facing away from the contact body.

15. The contact device according to claim 14, wherein the latching spring has a first spring portion between the recess and the first end, the first spring portion has a constant first material thickness along the spring axis and the latching spring has a second material thickness at the recess that is less than the first material thickness.

16. The contact device according to claim 14, wherein the stop face extends between an outer edge of the latching spring and an inner edge of the latching spring in a second direction inclined with respect to the longitudinal direction.

17. A contact device, comprising:

a contact housing defining a contact receptacle and a latching receptacle opening into the contact receptacle; and a contact element, including a contact body arranged within the contact receptacle and extending in a longitudinal direction and adapted to contact a mating contact of a mating contact device, and a latching spring connected to the contact body on a first end and extending along a spring axis into the latching receptacle, the latching spring having a stop face inclining obliquely with respect to the spring axis and abutting a face of the latching receptacle and a recess formed through the latching spring at first distance from the stop face, the stop face extends between an outer edge of the latching spring and an inner edge of the latching spring in a second direction inclined with respect to the longitudinal direction, the outer edge is arranged on a side of a free end of the latching spring that faces away from the contact body and the inner edge is arranged on a side of the free end of the latching spring that faces the contact body, a second distance between the outer edge and the face of the latching receptacle is smaller than a third distance between the inner edge and the face.

18. A contact device, comprising:

a contact housing defining a contact receptacle and a latching receptacle opening into the contact receptacle; and a contact element, including a contact body arranged within the contact receptacle and extending in a longitudinal direction and adapted to contact a mating contact of a mating contact device, and a latching spring connected to the contact body on a first end and extending along a spring axis into the latching receptacle, the latching spring having a stop face inclining obliquely with respect to the spring axis and abutting a face of the latching receptacle and a recess formed through the latching spring at first distance from the stop face, the stop face extends between an outer edge of the latching spring and an inner edge of the latching spring in a second direction inclined with respect to the longitudinal direction, the outer edge is arranged on a side of a free end of the latching spring that faces away from the contact body and the inner edge is arranged on a side of the free end of the latching spring that faces the contact body, the stop face has a cut portion and a broken portion, the cut portion adjoins the outer edge and extends in the second direction toward the contact body, the broken portion extends between the inner edge and the cut portion in the second direction.

19. The contact device according to claim 18, wherein in the cut portion a sheet-metal material of the latching spring is cut from the outer edge, in the second direction, to the inner edge and, in the broken portion, the sheet-metal material of the latching spring is broken toward the inner edge.

* * * * *